United States Patent
Kreichman et al.

(10) Patent No.: US 10,929,265 B2
(45) Date of Patent: *Feb. 23, 2021

(54) OPTIMIZING AUTOMATED INTERACTIONS WITH WEB APPLICATIONS

(71) Applicant: International Business Machines Corporation, Armonk, NY (US)

(72) Inventors: Igal Kreichman, Haifa (IL); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/124,205

(22) Filed: Sep. 7, 2018

(65) Prior Publication Data
US 2019/0004924 A1    Jan. 3, 2019

Related U.S. Application Data

(63) Continuation of application No. 13/917,914, filed on Jun. 14, 2013, now Pat. No. 10,108,525.

(51) Int. Cl.
*G06F 11/36*    (2006.01)
*G06F 16/951*    (2019.01)
(Continued)

(52) U.S. Cl.
CPC .......... *G06F 11/36* (2013.01); *G06F 11/3688* (2013.01); *G06F 16/951* (2019.01); *G06F 3/038* (2013.01); *H04L 67/02* (2013.01)

(58) Field of Classification Search
CPC .... G06F 11/36; G06F 11/3688; G06F 16/951; G06F 17/2725; G06F 3/038; H04L 67/02
See application file for complete search history.

(56) References Cited

U.S. PATENT DOCUMENTS 6,178,461 B1    1/2001    Chan et al.
6,487,555 B1    11/2002    Bharat et al.
(Continued)

FOREIGN PATENT DOCUMENTS

WO    2012000778 A1    1/2012

OTHER PUBLICATIONS

"Test Case Generation Using an Automated UI Web Application Crawler," IP.com Prior Art Database Technical Disclosure No. IPCOM000218268D, May 31, 2012, 3 pgs.
(Continued)

*Primary Examiner* — Quoc A Tran
(74) *Attorney, Agent, or Firm* — Cuenot, Forsythe & Kim, LLC

(57) ABSTRACT

Optimizing automated interactions with web pages by identifying, for each of multiple web pages, path information including an incoming hyperlink path having at least one hyperlink, where the incoming hyperlink path leads to the web page, and/or an outgoing hyperlink path having at least one hyperlink, where the outgoing hyperlink path emanates from the web page, determining whether the path information of each of the web pages meets a similarity condition, excluding from an interaction set of the web pages any of the web pages whose path information meets the similarity condition, and causing an automated interaction to be performed with any of the web pages in the interaction set.

18 Claims, 3 Drawing Sheets

(51) Int. Cl.
  *G06F 3/038*   (2013.01)
  *H04L 29/08*   (2006.01)
  *G06F 17/00*   (2019.01)

(56) References Cited

U.S. PATENT DOCUMENTS

| | | | |
|---|---|---|---|
| 6,658,402 | B1 | 12/2003 | Dutta |
| 7,424,484 | B2 * | 9/2008 | Ma .................... G06F 16/951 |
| 7,698,317 | B2 | 4/2010 | Sasturkar et al. |
| 7,783,642 | B1 | 8/2010 | Feng |
| 7,941,420 | B2 | 5/2011 | Chitrapura et al. |
| 8,046,681 | B2 | 10/2011 | Vudiswaran et al. |
| 8,055,626 | B1 * | 11/2011 | Jain .................... G06F 16/95 707/655 |
| 8,260,781 | B2 | 9/2012 | Dulitz et al. |
| 9,852,359 | B2 | 12/2017 | Yu et al. |
| 2008/0140606 | A1 | 6/2008 | Clark et al. |
| 2008/0162449 | A1 | 7/2008 | Chao-Yu et al. |
| 2009/0083314 | A1 | 3/2009 | Marim |
| 2009/0327237 | A1 | 12/2009 | Zhang et al. |
| 2010/0169311 | A1 | 7/2010 | Tengli et al. |
| 2011/0093773 | A1 | 4/2011 | Yee |
| 2011/0239104 | A1 * | 9/2011 | Prasad ................ G06F 11/3684 715/234 |
| 2012/0005217 | A1 | 1/2012 | Zendejas et al. |
| 2013/0173568 | A1 | 7/2013 | Josifovski et al. |
| 2014/0372847 | A1 | 12/2014 | Kreichman et al. |
| 2014/0372848 | A1 | 12/2014 | Kreichman et al. |

OTHER PUBLICATIONS

U.S. Appl. No. 13/917,914, Non-Final Office Action, dated Jun. 30, 2015, 21 pg.
U.S. Appl. No. 13/917,914, Final Office Action, dated Oct. 27, 2015, 30 pg.
U.S. Appl. No. 13/917,914, Non-Final Office Action, dated Oct. 18, 2016, 32 pg.
U.S. Appl. No. 13/917,914, Non-Final Office Action, dated Apr. 6, 2017, 31 pg.
U.S. Appl. No. 13/917,914, Non-Final Office Action, dated Oct. 19, 2017, 29 pg.
U.S. Appl. No. 13/917,914, Non-Final Office Action, dated May 3, 2018, 32 pg.
U.S. Appl. No. 13/917,914, Notice of Allowance, dated Jun. 12, 2018, pg.
U.S. Appl. No. 14/225,663, Non-Final Office Action, dated May 25, 2016, 11 pg.
U.S. Appl. No. 14/225,663, Final Office Action, dated Nov. 16, 2016, 14 pg.
U.S. Appl. No. 14/225,663, Non-Final Office Action, dated Mar. 10, 2017, 18 pg.
U.S. Appl. No. 14/225,663, Final Office Action, dated Sep. 8, 2017, 16 pg.
U.S. Appl. No. 14/225,663, Notice of Allowance, dated Jul. 11, 2018 pg.

* cited by examiner

OPTIMIZING AUTOMATED INTERACTIONS WITH WEB APPLICATIONS

FIELD OF THE INVENTION

The invention relates to computer software analysis and testing in general.

BACKGROUND OF THE INVENTION

Automated tools are often used to autonomously interact with Internet-based computer software applications, or "web" applications, such as to discover the various components of a web application for mapping purposes, or to identify programming errors and security vulnerabilities in a web application. For example, one such automated tool, commonly known as a "crawler," is often used to navigate a web application by traversing its web pages and other computer-based documents along hyperlinks, such as Universal Resource Locators (URLs), embedded in the documents that indicate the locations of other documents. Another such automated tool, commonly known as a "black-box tester," is often used to interact with a web application by activating interface elements such as its menus, buttons, and hyperlinks, and by providing data input through its interface elements such as textboxes, and then searching for evidence that an interaction exposed a known type of programming error or security vulnerability.

When traversing a web application such automated tools may encounter the same web page multiple times, in which case it is often desirable to avoid duplicating previous interactions with the web page, especially where time, processing, and/or networking resources available for interacting with a web application are limited. Unfortunately, this is often complicated by web applications that produce web pages that are equivalent yet not identical. For example, two instances of the same web page may be encountered, where each instance of the web page includes a different, dynamically-generated advertisement while otherwise being identical. Moreover, in some cases it is desirable to classify genuinely different web pages as being equivalent from a functional standpoint when deciding whether or not to interact with a web page. For example, a web application may have multiple static web pages, each with information on a different topic, but where each web page includes a single "OK" button that closes the web page. In this instance there is likely no benefit in having an automated tool interact with each of the web pages.

SUMMARY OF THE INVENTION

In one aspect of the invention a method is provided for optimizing automated interactions with web pages, the method including identifying, for each of a plurality of web pages, path information including any of a) an incoming hyperlink path having at least one hyperlink, where the incoming hyperlink path leads to the web page, and/or b) an outgoing hyperlink path having at least one hyperlink, where the outgoing hyperlink path emanates from the web page, determining whether the path information of each of the web pages meets a similarity condition, excluding from an interaction set of the web pages any of the web pages whose path information meets the similarity condition, and causing an automated interaction to be performed with any of the web pages in the interaction set. In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
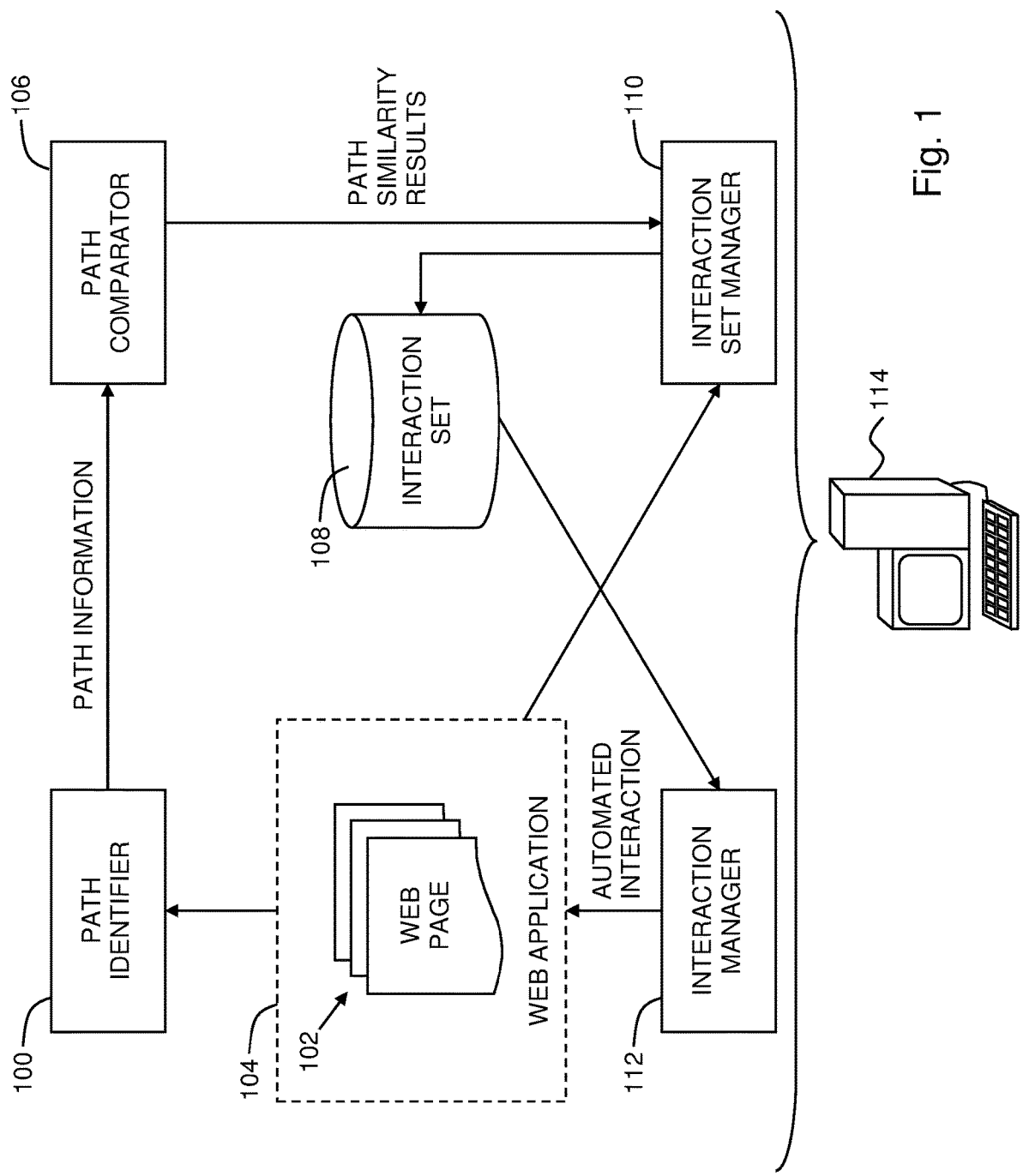
FIG. 1 is a simplified conceptual illustration of a system for optimizing automated interactions with web applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. As used herein, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for optimizing automated interactions with web pages, constructed and operative in accordance with an embodiment of the invention. In the system of FIG. 1, a path identifier 100 is configured to identify path information for each of multiple web pages 102 of a web application 104. The path information for any given one of web pages 102 preferably includes one or more incoming hyperlink paths, where each incoming hyperlink path includes one or more hyperlinks in one or more web pages, and where the hyperlinks that lie along the incoming hyperlink path lead to the given web page. Additionally or alternatively, the path information for any given one of web pages 102 preferably includes one or more outgoing hyperlink paths, where each outgoing hyperlink path includes one or more hyperlinks in one or more web pages, and where the hyperlinks that lie along the outgoing hyperlink path lead away from the given web page.

A path comparator 106 is configured to determine whether the path information of each of the web pages 102 meets a similarity condition. For example, the similarity condition may be met if all of the web pages in web pages 102 have identical path information to a predefined number of hyperlink hops from the web page, or alternatively if their path information is similar to a predefined degree of similarity using any known similarity measurement technique.

An interaction set 108 is configured to include any of the web pages 102, and an interaction set manager 110 is configured to exclude from interaction set 108 any of the web pages 102 whose path information meets the similarity condition, preferably such that only one of the web pages 102 whose path information meets the similarity condition remains in interaction set 108.

An interaction manager 112 is configured to cause an automated interaction to be performed with any of the web pages in interaction set 108, such as where the automated interaction is crawling any of the web pages in interaction set 108 or performing black-box testing of any of the web pages in interaction set 108.

Any of the elements shown in FIG. 1 are preferably implemented by, are embodied within, or are otherwise accessible to, a computing device 114, such as by implementing any of the elements in computer hardware and/or in computer software embodied in a non-transitory, computer-readable medium in accordance with conventional techniques.

Figure 2:
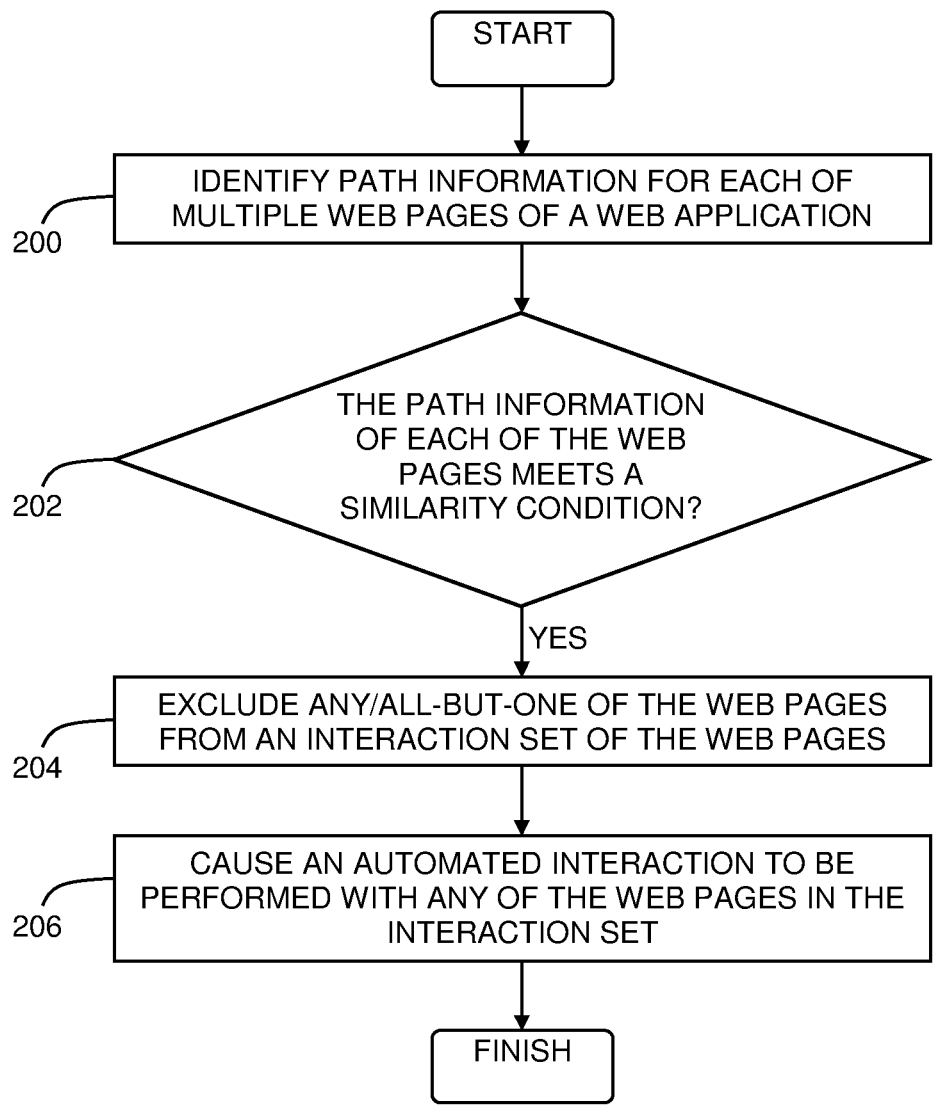
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, path information is identified for each of multiple web pages of a web application (step 200), where the path information for any given one of the web pages includes one or more incoming hyperlink paths and/or one or more outgoing hyperlink paths as described above. If the path information of each of the web pages meets a similarity condition (step 202), then any, and preferably all but one, of the web pages are excluded from an interaction set of the web pages (step 204). An automated interaction is caused to be performed with any of the web pages in the interaction set (step 206), such as where the automated interaction is crawling any of the web pages in the interaction set or performing black-box testing of any of the web pages in interaction set.

The system of FIG. 1 and method of FIG. 2 may be illustrated in the context of the following example, where during the traversal of a web application web pages are encountered at a time index $T_1$ and at a later time index $T_2$, where the web pages are now referred to by their time indices. The path information of hyperlinks leading to and from $T_1$ is identified as $L_1 \rightarrow L_2 \rightarrow L_3 \rightarrow T_1 \rightarrow L_4 \rightarrow L_5 \rightarrow L_6$ while the path information of hyperlinks leading to and from for $T_2$ is identified as $L_7 \rightarrow L_2 \rightarrow L_3 \rightarrow T_2 \rightarrow L_4 \rightarrow L_8 \rightarrow L_9$ Where the predefined similarity condition tests for identical incoming hyperlinks to within 2 hops from the web page and identical outgoing hyperlinks to within 1 hop from the web page, the path information for $T_1$ and $T_2$ meet the similarity condition. $T_1$ is included in the interaction set, while $T_2$ is preferably excluded from the interaction set as being equivalent to $T_1$, and an automated interaction is performed with respect to $T_1$ only.

Figure 3:
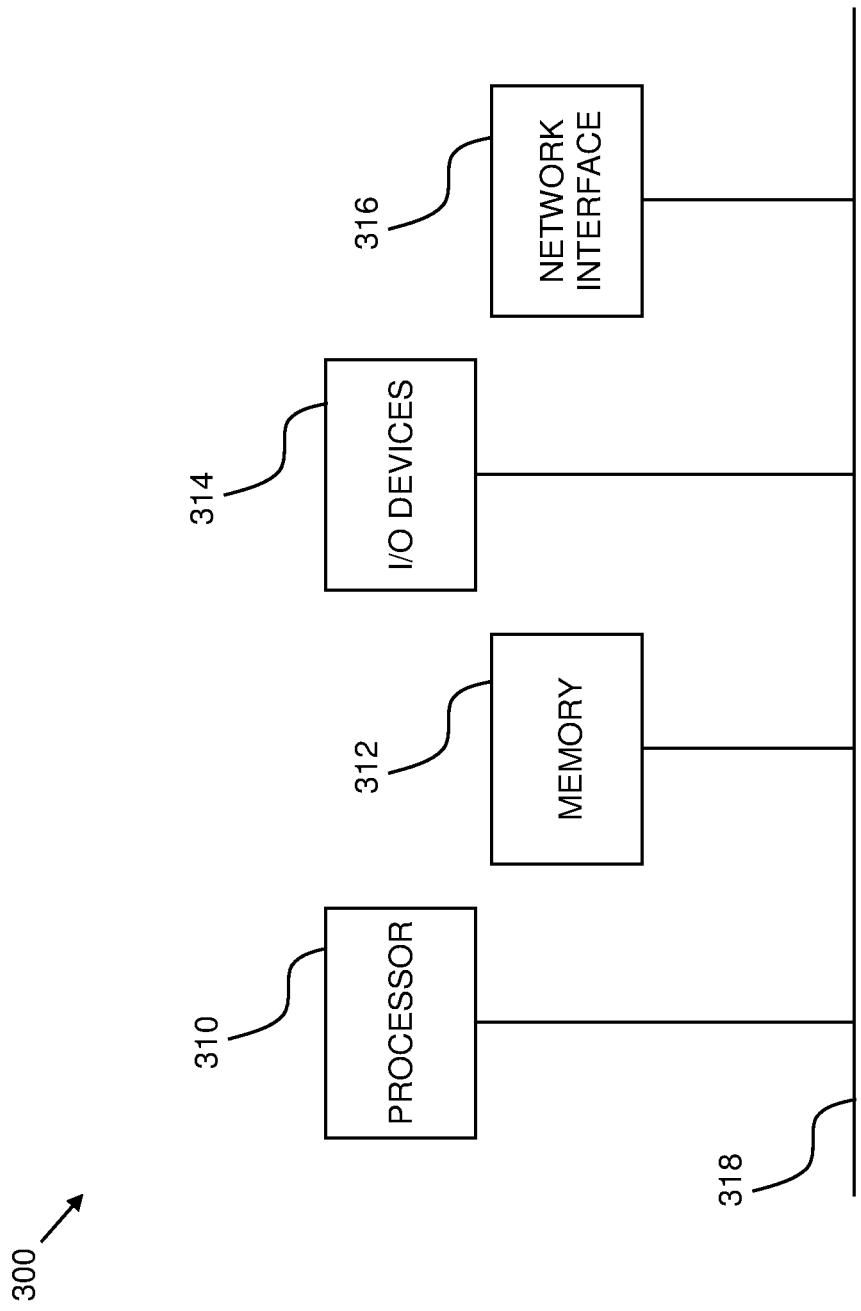
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for optimizing automated interactions with a plurality of web pages of a web application, comprising:
   identifying, for each of the plurality of web pages of the web application, path information including:
      a) an incoming hyperlink path that leads to a respective web page and has at least one hyperlink, or
      b) an outgoing hyperlink path that emanates from the respective web page and has at least one hyperlink;
   determining, relative to one another, whether the path information of each of the plurality of web pages meets a similarity condition;
   excluding from an interaction set of the plurality of web pages certain of the plurality of web pages whose path information meets the similarity condition; and
   causing, after the determining, an automated interaction to be performed with remaining web pages in the interaction set, wherein
   the determining includes comparing path information of one of the plurality of web pages with path information with a different one of the plurality of web pages.

2. The method of claim 1 wherein
   the similarity condition is met if the path information of the compared web pages is identical.

3. The method of claim 1 wherein
   the similarity condition is met if the path information of the compared web pages is identical within a predefined number of hyperlink hops from the web page.

4. The method of claim 1 wherein
   only one of the compared web pages whose path information meets the similarity condition remains in the interaction set upon the excluding.

5. The method of claim 1 wherein
   the automated interaction is crawling the web pages in the interaction set.

6. The method of claim 1 wherein
   the automated interaction is performing black-box testing on the web pages in the interaction set.

7. A computer hardware system configured to optimize automated interactions with a plurality of web pages of a web application, comprising:
   a hardware processor configured to initiate the following executable operations:
      identifying, for each of the plurality of web pages of the web application, path information including:
         a) an incoming hyperlink path that leads to a respective web page and has at least one hyperlink, or
         b) an outgoing hyperlink path that emanates from the respective web page and has at least one hyperlink;
      determining, relative to one another, whether the path information of each of the plurality of web pages meets a similarity condition;
      excluding from an interaction set of the plurality of web pages certain of the plurality of web pages whose path information meets the similarity condition; and causing, after the determining, an automated interaction to be performed with remaining web pages in the interaction set, wherein
the determining includes comparing path information of one of the plurality of web pages with path information with a different one of the plurality of web pages.

8. The system of claim 7 wherein
the similarity condition is met if the path information of the compared web pages is identical.

9. The system of claim 7 wherein
the similarity condition is met if the path information of the compared web pages is identical within a predefined number of hyperlink hops from the web page.

10. The system of claim 7 wherein
only one of the web pages whose path information meets the similarity condition remains in the interaction set upon the excluding.

11. The system of claim 7 wherein
the automated interaction is crawling the web pages in the interaction set.

12. The system of claim 7 wherein
the automated interaction is performing black-box testing on the web pages in the interaction set.

13. A computer program product, comprising:
a hardware storage device having program code stored thereon for optimizing automated interactions with a plurality of web pages of a web application,
the program code, which when executed by a computer hardware system, causes the computer hardware system to perform:
   identifying, for each of the plurality of web pages of the web application, path information including:
      a) an incoming hyperlink path that leads to a respective web page and has at least one hyperlink, or
      b) an outgoing hyperlink path that emanates from the respective web page and has at least one hyperlink;
   determining, relative to one another, whether the path information of each of the plurality of web pages meets a similarity condition;
   excluding from an interaction set of the plurality of web pages certain of the plurality of web pages whose path information meets the similarity condition; and
   causing, after the determining, an automated interaction to be performed with remaining web pages in the interaction set, wherein
the determining includes comparing path information of one of the plurality of web pages with path information with a different one of the plurality of web pages.

14. The computer program product of claim 13 wherein
the similarity condition is met if the path information of the compared web pages is identical.

15. The computer program product of claim 13 wherein
the similarity condition is met if the path information of the compared web pages is identical within a predefined number of hyperlink hops from the web page.

16. The computer program product of claim 13 wherein
only one of the web pages whose path information meets the similarity condition remains in the interaction set upon the excluding.

17. The computer program product of claim 13 wherein
the automated interaction is crawling the web pages in the interaction set.

18. The computer program product of claim 13 wherein
the automated interaction is performing black-box testing on the web pages in the interaction set.

\* \* \* \* \*